United States Patent

[11] 3,618,796

| [72] | Inventor | Israel D. Peisner<br>Huntington Woods, Mich. |
|---|---|---|
| [21] | Appl. No. | 844,873 |
| [22] | Filed | July 25, 1969 |
| [45] | Patented | Nov. 9, 1971 |
| [73] | Assignee | Whitehead & Kales Company<br>River Rouge, Mich. |

[54] VEHICLE LOADING AND TRANSPORT SYSTEM
5 Claims, 13 Drawing Figs.

[52] U.S. Cl................................................. 214/38 BA,
105/368 R, 214/38 D, 214/334, 214/515, 296/1 A
[51] Int. Cl..................................................... B65g 67/02
[50] Field of Search........................................ 214/38,
38.22, 38.8, 515, 516, 517, 16.14 A, 16.14 C,
16.14 E, 330–334; 296/1 A; 105/368

[56] References Cited
UNITED STATES PATENTS

| 1,962,127 | 6/1934 | Balkema et al. ............... | 214/333 |
| 3,498,480 | 3/1970 | Gutridge ....................... | 214/38 |
| 3,511,392 | 5/1970 | Blunden et al. ................ | 214/38 |

Primary Examiner—Robert G. Sheridan
Attorney—Whittemore, Hulbert & Belknap

ABSTRACT: The invention is embodied in a vehicle transport, in this instance a rail car, having a plurality of upright pedestals adapted to support the front wheels of vehicles arranged in tandem on the transport. Apparatus is also provided for transferring the pedestals and vehicles to or from the transport.

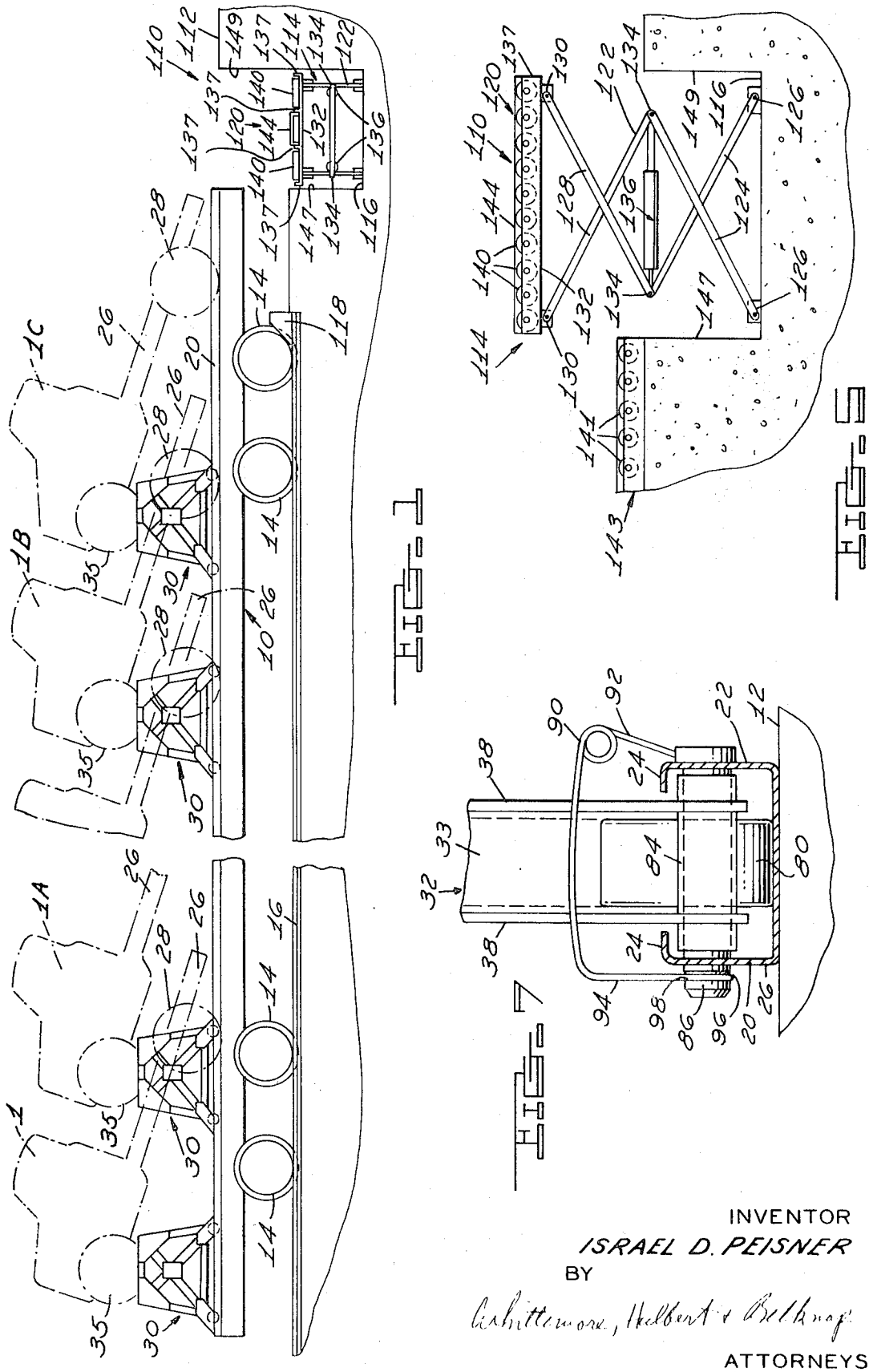

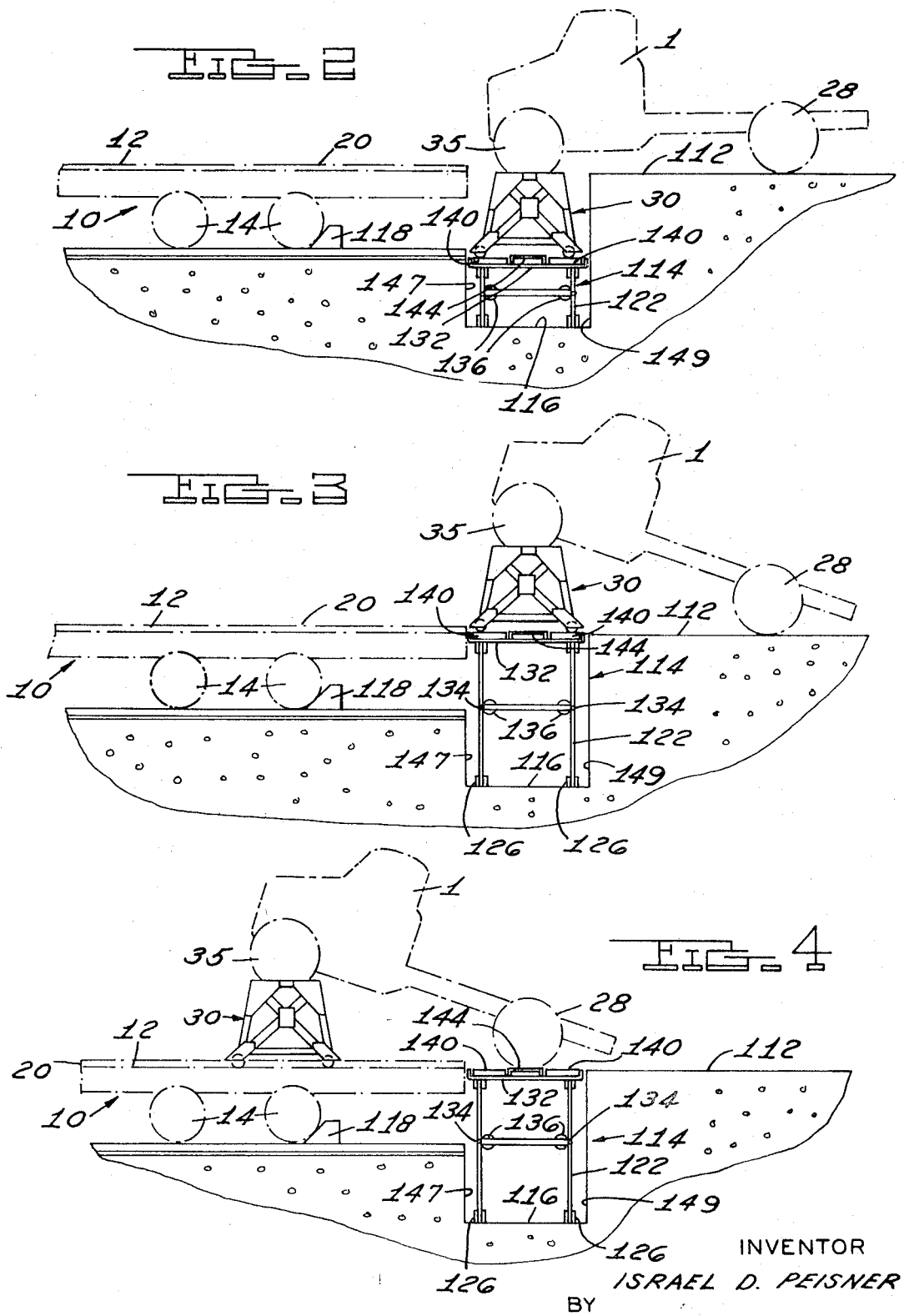

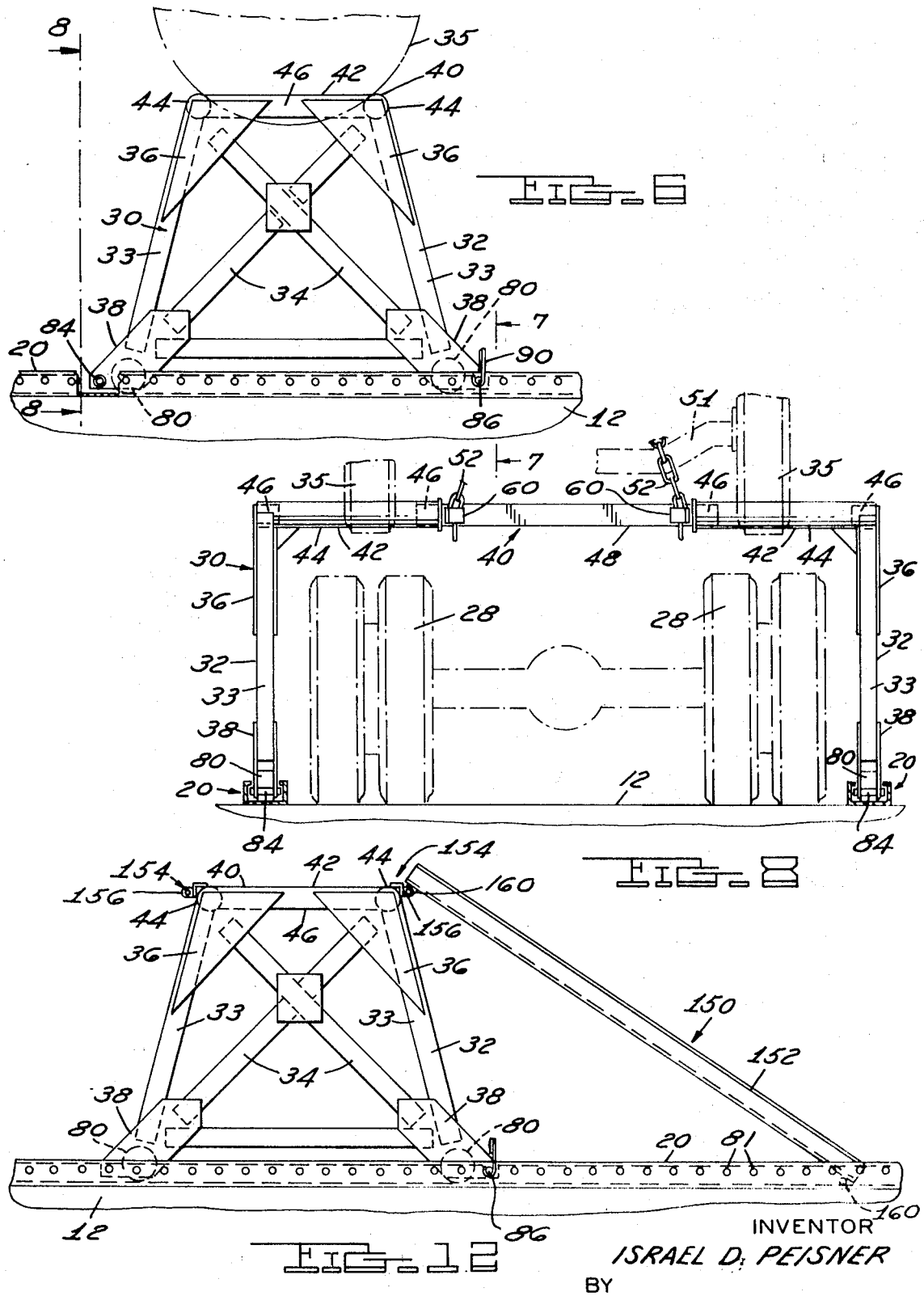

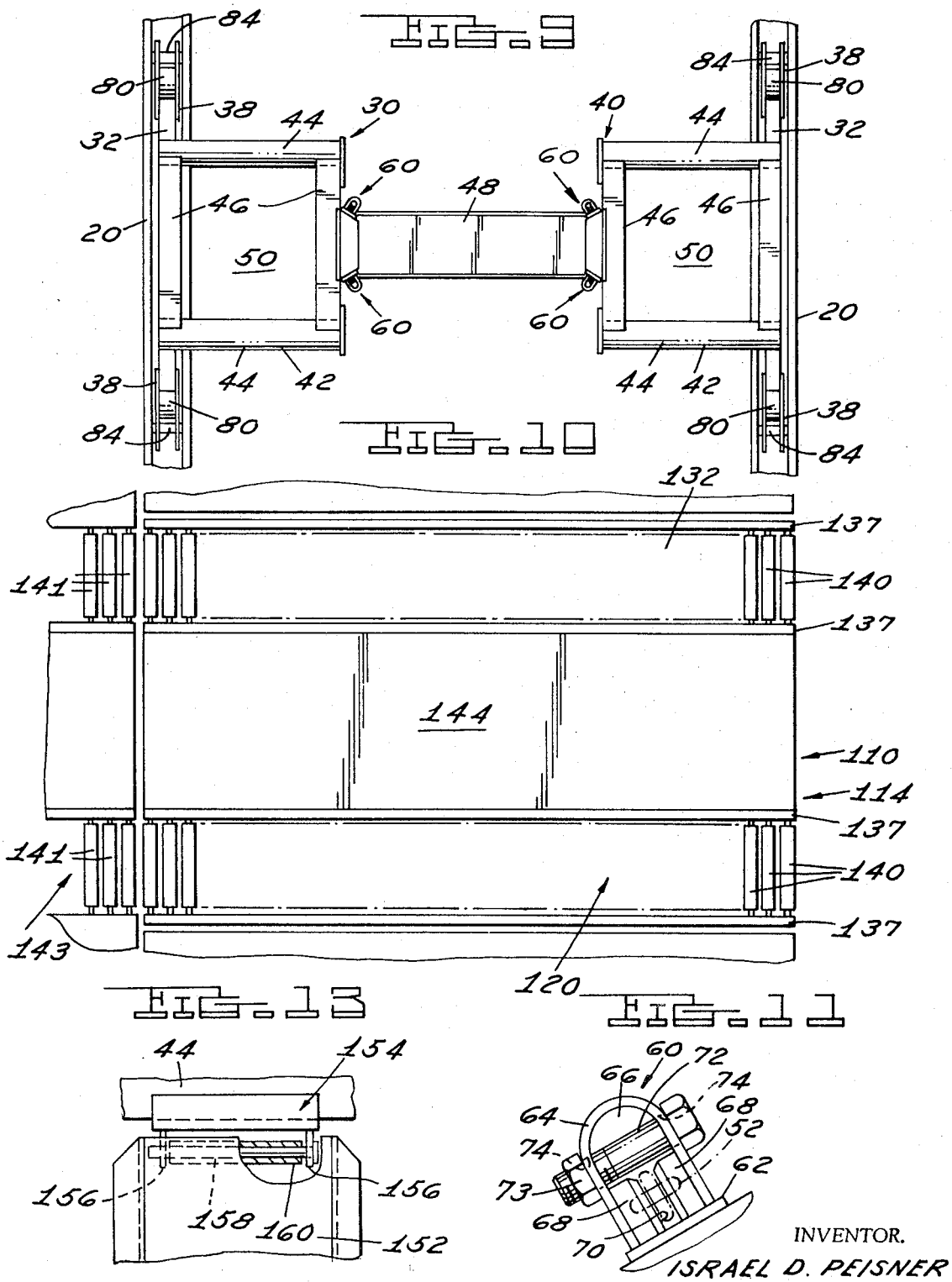

VEHICLE LOADING AND TRANSPORT SYSTEM

"Saddleback" loading is an arrangement of in-line vehicle loading, with the front end of each vehicle raised and placed over the rear chassis and wheels of the inclined vehicle immediately in front of it. By thus placing the front end of one vehicle over the rear of another and supporting it thereon, overall linear distance of the loaded vehicles is reduced and obviously more vehicles can be loaded in a given length of transport.

Saddleback loading as presently performed requires each vehicle driven onto the transport to be lifted by a hoist or straddle crane. The front end of the lead vehicle is lifted and secured to a support at the front end of the transport. The crane then lifts the front end of the next vehicle up over the rear end and wheels of the lead vehicle. A mounting saddle made of hardwood is fitted to the chassis of the lead vehicle and secured thereto by steel banding. The crane lowers the front end of the second vehicle into position on the top of this wood saddle so that the front axle rests on the wood saddle and transfers the weight to the chassis of the lead vehicle. The second vehicle is then secured by chains to the deck of the transport by various mechanical tiedown devices permanently attached to the deck of the transport. The front of each succeeding vehicle is lifted over and secured to a wood saddle on the chassis at the rear of the vehicle ahead of it in the same manner as the second vehicle. Both front and rear ends of the vehicles are required to be tied down because one vehicle rests upon another. If both ends were not tied down and the tiedown devices for one vehicle became loose all of the vehicles would be endangered.

At the unloading point, a crane, hoist and crew are again required to unload the vehicles. Since each vehicle rests upon the vehicle ahead of it, the last vehicle loaded must obviously be the first vehicle unloaded. The wood saddles are taken off (usually discarded) and the crane lifts each vehicle clear, moves it back, and sets it down at which point it must be backed off the transport by a driver. This procedure is repeated for each vehicle on the transport.

Although the present inclined saddleback loading system permits the maximum number of vehicles to be loaded in a given length, the means to accomplish this type of loading are extremely slow, costly and inefficient. The inherent disadvantages are:

1. A crane and crew are required.
2. Each vehicle must be individually lifted, moved and lowered into position on a support or on wood saddles.
3. The wood saddles must be handmade to fit and nest to various wheel heights.
4. The wood saddles must be mounted and securely banded to the vehicle chassis. (Hardwood and steel banding are expensive).
5. Multiple tiedown chains must be extended and crisscrossed to span the height from the front axle or chassis down to the tiedown fittings on the transport deck.
6. The upper vehicle front axle resting on the wood saddle transmits its static and dynamic loads directly to the chassis of the lower vehicle without the advantage of shock attenuation provided by the tires of the upper vehicle.
7. The transport must be loaded and unloaded in one direction since the last vehicle loaded must be the first unloaded. This, in many cases, requires long delays in switching and reversing directions of the transport.

SUMMARY OF THE INVENTION

It is an essential object of this invention to provide an improved vehicle loading, unloading and transport system which overcomes the disadvantages of the saddleback system.

Another object is to provide a system in which a plurality of upright pedestals are secured in selected positions along the deck of the transport to support the front ends of vehicles arranged in tandem on the transport.

Another object is to provide a system in which the front ends of the vehicles are held in elevated positions by the pedestals above the rear ends of the preceding vehicles to simulate a saddleback loading arrangement.

Another object is to provide a system wherein the pedestals comprise frame structures extending transversely of the transport, preferably having rollers guided by tracks extending lengthwise of the transport.

Another object is to provide pedestals having wheel-receiving recesses or pockets to receive and support the front wheels of the vehicles.

Another object is to provide means for securing the pedestals in selected positions along the tracks preferably including pins adapted to extend through selected holes spaced apart lengthwise of the tracks.

Another object is to provide apparatus for transferring vehicles to or from a transport of the type described.

Another object is to provide apparatus for transferring vehicles comprising an elevator having a pedestal support adjacent one end of the transport when the transport is moved to a vehicle transfer position adjacent the apparatus, and means for raising the pedestal support to approximately the level of the tracks on the transport so that the pedestals can be moved from the trucks to the pedestal support and vice versa.

Another object is to provide a method of transferring wheeled vehicles to and from a transport.

Another object is to provide upright pedestals having ramps for guiding the front wheels of the vehicle up to the wheel-receiving pockets in the pedestals.

Other objects and features of the invention will become apparent as the description proceeds, especially when taken in conjunction with the accompanying drawings, wherein:

FIG. 1 is a fragmentary side elevational view with parts in phantom lines showing a railcar in position adjacent the vehicle loading and unloading apparatus.

FIGS. 2, 3 and 4 are fragmentary views similar to a portion of FIG. 1 showing a truck in a sequence of three positions during loading.

FIG. 5 is an enlarged view of the elevator, shown in elevated position and taken 90° from the illustration in FIG. 1.

FIG. 6 is an enlarged view of another portion of FIG. 1, showing a pedestal on the railcar in side elevation.

FIG. 7 is a fragmentary sectional view taken substantially on the line 7—7 in FIG. 6.

FIG. 8 is a view partly in section and partly in elevation taken substantially on the line 8—8 in FIG. 6.

FIG. 9 is a plan view of the pedestal shown in FIG. 8.

FIG. 10 is a plan view of the elevator and associated ramp structure.

FIG. 11 is an enlarged view of a portion of FIG. 9, showing a chain lock.

FIG. 12 is similar to FIG. 6 but shows a modification.

FIG. 13 is an enlarged plan view of a portion of FIG. 12.

Referring now more particularly to the drawings, the vehicle transport is specifically shown as a railcar 10, although it might be some other type of transport, such for example as a highway trailer.

The rail car 10 has an elongated generally horizontal deck or bed structure 12 extending lengthwise of the railcar and supported on the usual wheels 14 adapted to run on tracks 16. Laterally spaced tracks 20 are secured to and extend along the deck lengthwise of the railcar. These tracks are parallel to one another and preferably horizontal throughout their lengths and open at both ends to permit vehicle loading and unloading from either end of the rail car. The tracks 20 are of the substantially channel shape shown in FIG. 7 with the base of the channel engaging the deck 12 and the sides or legs 22 extending vertically upwardly and having horizontally inturned flanges 24 at the upper ends. The spacing between the tracks 20 is greater than the width of the wheeled vehicles or trucks 1, 1A, 1B, etc. to be carried on the railcar.

The trucks 1, 1A, 1B, etc., are adapted to be loaded on the railcar in a simulated saddleback arrangement as shown in FIG. 1 with the front end of each truck raised and placed over the rear chassis 26 and wheels 28 of the inclined truck immediately in front of it. The front ends of the trucks are held in raised position by pedestals 30. The pedestals 30 preferably comprise frame structures extending transversely of the transport, having the upright side frame members 32 composed of the legs 33 and braces 34 rigidly secured together by the plates 36 and 38, and the upper horizontal transverse saddle unit 40 extending between and secured to the upper ends of the side frame members 32. The saddle unit 40 includes the end wheel-supporting portions 42 composed of the bars 44 and 46 which are rigidly connected by the center bar or truss 48. The bars 44 and 46 of each wheel-supporting portion form a rectangle and define an open or bottomless pocket 50 for receiving a wheel 35, or more specifically a tire, on the front end of a truck. The bars 44 which are the transverse bars are spaced apart substantially less than the diameter of a tire to be received, but far enough to allow the tire to descend sufficiently into the pocket to be firmly held against forward or rearward shifting movement.

Chains 52 are provided for each pedestal to be extended over the front axle 51 of the truck and prevent the wheels from lifting out of the pockets. These chains do not have to be placed under tension. They merely require sufficient manual tightening to prevent the tires from lifting out of the pockets, since the tires are received deeply enough in the pockets to prevent forward or rearward shifting of the truck. Thus, the pockets provide the sole means for restraining longitudinal movement of the trucks, and the chains 52 prevent the wheels from lifting out of the pockets.

Suitable chain locks are provided to secure the ends of the chains to the saddle unit 40 of the pedestal. These chain locks may be secured to gussets on the center bars 48, and are shown as being in the form of brackets 60 having an open frame consisting of a base plate 62 and a U-shaped plate 64, the ends of which are secured to the base plate to define an opening 66. A pair of spaced parallel lugs 68 are secured to the frame within the opening, contacting the base plate 62 at one end and extending toward the curved portion of plate 64. The chains 52 are link chains and may obviously be passed through the portion of the opening 66 remote from the base plate. One of the links may be passed into the slot 70 between the lugs, and a locking bolt 72 inserted through aligned openings 74 in the curved plate 64 across the opening 66 adjacent the open end of slot 70 may be secured by a nut 73 to prevent the chain end from moving laterally out of the slot. Two chains 52 are provided to tie down the front axle to each pedestal, and two chain lock brackets 60 for each chain are mounted on the pedestal to secure the chain ends thereto.

The plates 38 at the lower ends of the side frame members 32 of the pedestals are arranged in pairs, two being secured to each of the legs 33 of each side frame member 32. The pairs of plates 38 are disposed in parallel planes which are close enough together to fit between the flanges 24 of the tracks 20 (see FIG. 7). Rollers 80 are journaled respectively on the pairs of plates 38. The rollers 80 on the two side frame members 32 are spaced apart the same distance as tracks or channels 20 and roll upon the bases of the channels to thereby support the pedestals for rolling movement lengthwise of the rail car. Each pair of plates 38 also has a transverse tube or pipe 84 extending through holes therein and permanently secured thereto with the projecting ends thereof disposed under the flanges 24 to prevent the pedestals from lifting out of the tracks 20.

Locking pins 86 (FIG. 7) are adapted to be extended through the tubes 84 to lock the pedestals in adjusted position lengthwise of tracks 20. Each track has a plurality of holes 87 in its vertical sides 22 which are respectively aligned with one another and which are spaced apart uniformly from end to end of the track. Thus a locking pin 86 may be extended through a pair of aligned holes 87 in the track and through a pipe 84 to lock the pedestal in position. Preferably at least one pin is employed to secure each side frame member 32 of each pedestal 30 in locked position with respect to the tracks. A wire latch 90 may be provided for each locking pin 86 to prevent the accidental removal thereof, having one end 92 secured to the head of the locking pin and the other end 94 with a return-bent portion 96 adapted to engage in a groove 98 in the opposite end of the locking pin. If desired, a chain may be secured to the wire latch 90 and to one of the plates 38 to prevent the locking pin 86 from becoming separated from the pedestal.

When the trucks are in loaded position on the railcar, the rear wheels 28 of the trucks are supported on the deck 12 between tracks 20 and the front wheels are supported by the saddle yoke units 40 of the pedestals 30 in elevated position over the rear chassis 26 and wheels 28 of the inclined truck immediately in front of it. The pedestals 30 support the front wheels 35 high enough to clear the rear chassis and wheels of the next preceding truck in the line so that each truck is individually supported and does not rest on another as is common in conventional saddleback loading.

The apparatus for loading or unloading is generally designated 110 and is located at a loading and unloading station at the end of the railroad tracks. As shown, there is a dock 112 substantially level with the deck of the railcar, and an elevator 114 mounted in a pit 116 between the dock 112 and the end of the railcar when the railcar is in the loading and unloading position with its wheels 14 up against stop 118.

The elevator has a pedestal support or lifting platform 120 which is horizontally disposed and which is mounted on a hydraulic scissors-type lifting unit 122. Lifting unit 122 may be of any suitable construction and is shown as being composed of the lower crossing links 124 pivoted at their lower ends on pins 126 supported in fixed positions at the bottom of the pit 116, and upper links 128 pivoted at their upper ends on pins 130 carried by the base plate 132 of the pedestal support or platform 120. The upper ends of the links 124 are respectively pivoted to the lower ends of links 128 by pivot pins 134. Piston cylinder assemblies 136, which may be either of the hydraulic or air type, have the cylinder portions secured to one of the hinge pins 134 and the piston portions connected to the other of the hinge pins 134 to raise or lower the pedestal support or platform 120 by the extension or retraction of the piston cylinder assemblies 136.

The pedestal support or platform 120 includes a plurality of small diameter closely spaced parallel rolls 140 which extend parallel to the tracks 20 of the railcar when the railcar is in the loading or unloading position of FIG. 1. The rolls 140 are arranged in two parallel rows spaced apart a distance approximating the spacing between the rollers 80 of each side frame member 32 of the pedestals. The ends of the rolls are journaled for rotation in the flanges 137 extending upwardly from the base plate 132. The top surfaces of the rolls provide a supporting surface for the pedestals over which the pedestals may pass in a direction transverse to the axes of rotation of the rolls. The pedestals are, of course, supported by their rollers 80 during such movement, with the axes of rollers 80 at right angles to the axes of rolls 140. There is a plate 144 on platform 120 between the rows of rolls 140 so that the pedestals can be moved forwardly and rearwardly to and from the elevator. The plate 144 may be level with rolls 140 or preferably slightly above them to prevent accidental movement of a pedestal on the platform. Similar rows of rolls 141, parallel to rolls 140, are journaled on a ramp 143 at one side of the elevator at the same level as the rolls 140 on the platform when the platform is in its lower position to permit pedestals to be moved to and from the lifting platform. It will be understood that the tools 140 and 141 are small enough in diameter and sufficiently closely spaced to permit the rollers 80 of the pedestal to pass smoothly over them in a longitudinal or transverse direction. For this purpose, the rollers 80 are preferably wider than the distance between the axes of the rolls.

The piston cylinder assemblies 136 are adapted to raise and lower the platform 120 between an upper position shown in FIG. 5 and a lower position shown in FIG. 1. In the upper position, the upper surfaces of the rolls 140 of the platform 120 are substantially level with the tracks 20 on the deck of the railcar. In the lower position, the rolls 140 on the lifting platform 120 are level with rolls 141 on the ramp 143. When platform 120 is in its lower position, the saddle unit 40 of a pedestal 30 on the platform is at substantially the level of the dock 112 and the tracks 20 on the deck of the railcar.

In order to load trucks onto a railcar, the railcar is first placed in the transfer position shown in FIG. 1. If the pedestals are carried by the empty railcar, they are removed one at a time by raising the lifting platform 120, moving a pedestal from the railcar to the lifting platform, lowering the lifting platform and then pushing the pedestal transversely from the lifting platform onto ramp 143. The pedestals may be lined up on the ramp 143 with the axes of the pedestal rollers 80 at right angles to the axes of the ramp rolls 141 preparatory for use in loading the railcar. To load a truck on the railcar, a pedestal is moved sidewise from rolls 141 onto the rolls 140 of the platform 120, the latter, of course, being in its lower position. A truck is driven onto the dock 112 until its front wheels pass from the loading dock onto the pedestal 30 supported by the elevator and its front wheels drop into the pockets 50. The truck is now in the position shown in FIG. 2. With the lifting platform in its lower position at this time, the pedestal is restrained from moving forwardly or rearwardly by the pit walls 147 and 149 and by plate 144. The elevator 114 is then raised to its upper position in which the rollers 80 of the pedestal are aligned with the tracks 20. The truck is now in an inclined position (FIG. 3). Continued forward movement of the truck under its own power pushes the pedestal 30 forward onto the railcar causing the rollers 80 to roll into the open ends of tracks 20. The rear wheels of the truck will pass over the platform 120 of the elevator and the truck, with its front end supported on the pedestal, is driven to the remote end of the railcar.

The elevator is then returned to its lower position to receive the next pedestal from ramp 143. Succeeding trucks are loaded in tandem on the railcar in the same manner as the first.

The lock pins 86 will of course be utilized to lock the pedestals in the desired position of lengthwise adjustment with respect to the tracks 20, and the chains 52 are looped over the front axles 51 of the trucks and secured down by manual tension and locked to the brackets 60 on the pedestals. Actually the front axle may be secured to the pedestal at some convenient point prior to its final loaded position on the railcar, such as while the pedestal is on the elevator. The front end of each inclined truck except the lead truck, is thus supported over the rear chassis and wheels of the truck in front of it. Sin since the trucks are not supported upon one another but are individually secured in a simulated saddleback arrangement on the railcar and since both ends of the tracks 20 are open, the trucks may be unloaded from either end of the railcar.

In order to unload trucks from the railcar, the railcar is placed in the transfer position shown in FIG. 1 with either end of the railcar adjacent to the elevator 114. FIG. 1 shows the railcar in position for rearward unloading of the trucks. The platform 120 is raised to its upper level. The pedestal 30 supporting the front wheels of the first truck is unlocked from tracks 20 by removing pins 86, and the truck is backed off the railcar. Its rear wheels pass over the lifting platform 120 and the pedestal 30 supporting the front wheels is moved from the railcar onto the lifting platform 120. The elevator is then lowered (FIG. 2), the chains 52 are untied, and the truck is backed completely onto the dock 112, its front wheels of course lifting out of the pockets 50 of the pedestal during this movement. The chains 52 may, if desired, be released at the time the pedestal is unlocked from the tracks 20. The pedestal is then pushed off the lifting platform 120 onto the ramp 141. This operation is repeated until all of the trucks have been unloaded.

In order to unload the trucks in a forward direction, the platform 120 is raised to its upper level, the pedestal for the first truck is unlocked from the tracks 20, and the first truck is driven until its supporting pedestal is supported on the platform 120. The platform 120 is then moved to its lower position and the truck is driven forward until its front wheels lift out of the pockets 50 and move onto the dock 112. The truck is stopped with its rear wheels remaining on the railcar. The pedestal 30 is pushed onto ramp 141, the platform is again raised to its upper position, and the truck then completely driven onto the dock 112, its rear wheels passing over the elevator platform 120. The chains are untied either at the time the pedestal is unlocked, or when the pedestal is moved onto the platform 120.

When loaded on the railcar, each truck has its front end tied down to its supporting pedestal, and each pedestal is locked to tracks 20. No other tiedown means are required.

The following is a brief outline of the loading and unloading operations:

LOADING

1. Position empty railcar adjacent dock (either end of car).
2, Unload pedestals from railcar one at a time and store on ramp alongside elevator.
3. Place one pedestal on elevator — lower position.
4. Drive truck onto pedestal.
5. Raise elevator (with pedestal) to height of car deck.
6. Tie truck to pedestal.
7. Drive truck (on pedestal) to load position on railcar.
8. Lock pedestal to track on railcar.
0. After truck is driven over elevator (item 7), elevator is lowered.
10. Roll an empty pedestal onto elevator — lower position.
11. Repeat items 4 thru 8 until entire railcar is loaded.

UNLOADING

1. Place loaded railcar to dock (either end of rail car — trucks may be driven off or backed off).

| Driving Off Forward | Backing Off |
|---|---|
| 2. Raise elevator to upper level. | 2. Raise elevator to upper level. |
| 3. Drive truck so that pedestal is on elevator. | 3. Back truck so that pedestal is on elevator. |
| 4. Lower elevator. | 4. Lower elevator. |
| 5. Drive truck front wheels only, onto dock. | 5. Back truck onto dock |
| 6. Push pedestal off elevator. | 6. Push pedestal off elevator. |
| 7. Raise elevator. | 7. Repeat items 2 thru 6 until entire load is removed. |
| 8. Complete driving truck off. | |
| 9. Repeat items 3 thru 8 until entire load is removed. | |

FIGS. 12 and 13 illustrate a pedestal which has been modified to support a ramp 150 consisting of a pair of skids 152 by which the front wheels of a truck may be driven up from the deck level to the top of the pedestal. This construction obviously eliminates the need for an elevator.

The pedestal shown in FIG. 12 is the same as that previously described except for the addition of the supporting structures 154 mounted on the saddle unit 40 for supporting the skids 152. There are four supporting structures 154, one mounted on each of the transverse bars 44 of the pockets 50. Actually only two such structures 154 are required, mounted either on the two front bars 44 or on the two rear bars 44, but four such structures are provided so that the pedestals may be loaded from either end.

Each structure 154 comprises a pair of laterally spaced brackets 156 having aligned holes for receiving a removable locking pin 158. Each skid 152 is in the form of an elongated track section having a transverse cylindrical tube or pipe 160 secured to the undersurface at each end thereof. In order to mount a skid on a pedestal, one end is elevated to position its tube or pipe 160 between the brackets 156 in alignment with the holes thereof, and the locking pin 158 in alignment with the holes thereof, and the locking pin 158 is inserted through the holes and through the pipe. Obviously, with a pedestal locked in adjusted position on the railcar as seen in FIG. 12 and with a pair of skids 152 having their upper ends mounted upon the bars 44 of the two pockets 50 of the pedestal and having their lower ends resting upon the deck 12, the front wheels of a truck driven onto the railcar will be guided up to the pockets 50 by the skids.

In certain of the claims which follow, reference is made to the vehicle front wheels as being received in the pockets 50. The use of the term "wheels" should be understood to include the tires on the wheel rims since it is the tires which are actually supported in the pockets.

What I claim as my invention is:

1. In combination, a vehicle transport having an elongated deck, parallel tracks mounted upon and extending lengthwise of said deck, said tracks being spaced apart laterally a distance greater than the width of the vehicles to be transported, a plurality of upright pedestals having laterally spaced upright side members provided with antifriction means at their lower ends engaging said tracks to permit movement of said pedestals lengthwise of said deck, said pedestals each having a generally horizontal transverse saddle unit connecting the upper ends of said side members, said saddle units being adapted to support the front ends of vehicles arranged in tandem on said transport in superimposed relation above the rear ends of the preceding vehicles, said saddle unit and side members of each pedestal defining an open frame construction of inverted U shape adapted to clear the rear end of the preceding vehicle, and means for securing said pedestals to said tracks in selected positions lengthwise of said deck.

2. The combination defined in claim 1, wherein each saddle unit has a pair of support means in the form of wheel-receiving recesses adapted to receive and support the front wheels of a vehicle.

3. The combination defined in claim 1, wherein each saddle unit has a pair of open, horizontal, substantially rectangular frames defining bottomless pockets to receive the front wheels of a vehicle, said rectangular frames having front and rear transverse members defining the front and rear margins of said pockets and spaced apart less than the diameter of said wheels to engage the peripheries of said wheels at circumferentially spaced points to restrain the vehicles from longitudinal movement, and means for holding said wheels against upward movement with respect to said pockets.

4. The combination defined in claim 3, wherein said tracks are in the form of upwardly opening channels having laterally spaced flanges terminating at their upper ends in inturned flanges, the side members of said pedestals having transverse open-ended tubular members within said channels under said inturned flanges to prevent said pedestals from lifting out of said channels, said means for securing said pedestals to said channels including pins insertable through said tubular members and through registering holes in said laterally spaced flanges of said channels.

5. The combination defined in claim 1, including ramps adapted to be removably connected at one end to said saddle units and to extend downwardly at an angle to permit the front wheels of the vehicles to run up said ramps to said pockets.

* * * * *